(12) United States Patent
Brakus

(10) Patent No.: US 6,281,669 B1
(45) Date of Patent: Aug. 28, 2001

(54) CIRCUIT ARRANGEMENT AND METHOD FOR LIMITING CURRENT FOR CONSUMERS OF ALTERNATING CURRENT

(75) Inventor: Bogdan Brakus, Stockdorf (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/486,944

(22) PCT Filed: Aug. 14, 1998

(86) PCT No.: PCT/DE98/02361

§ 371 Date: Mar. 2, 2000

§ 102(e) Date: Mar. 2, 2000

(87) PCT Pub. No.: WO99/12240

PCT Pub. Date: Mar. 11, 1999

(30) Foreign Application Priority Data

Sep. 2, 1997 (DE) .............................. 197 38 364

(51) Int. Cl.[7] .................................................. G05B 24/02
(52) U.S. Cl. ............................................. 323/324; 323/908
(58) Field of Search ..................................... 323/299, 324, 323/908; 361/18, 58, 101; 363/49, 50, 52, 53

(56) References Cited

U.S. PATENT DOCUMENTS 4,396,882   8/1983   Kellenbenz .......................... 323/278

FOREIGN PATENT DOCUMENTS

| 32 41 668 C2 | 5/1984 | (DE) . |
| 35 02 195 A1 | 7/1986 | (DE) . |
| 35 02 195 | * 7/1986 | (DE) . |
| 39 32 776 A1 | 4/1991 | (DE) . |

* cited by examiner

Primary Examiner—Peter S. Wong
Assistant Examiner—Gary L. Laxton
(74) Attorney, Agent, or Firm—Schiff Hardin & Waite

(57) ABSTRACT

In a circuit arrangement for limiting peak current, an inverter provides at an AC voltage output a series circuit of a consumer and a rectifier unit connected across the output. A current limiter connects across output terminals of the rectifier unit. The current limiter has first and second terminals, a series circuit formed of a measuring shunt and a switching element being connected across the first and second terminals. A control input of the switching element is connected to an output of a current regulator. First and second input terminals of the current regulator connect to both sides of the measuring shunt. The current regulator is designed to control a switching element such that when a current maximum representing a peak current flows, a height of the peak current is limited to a desired maximum current value determined primarily by a potential across said measuring shunt.

7 Claims, 6 Drawing Sheets

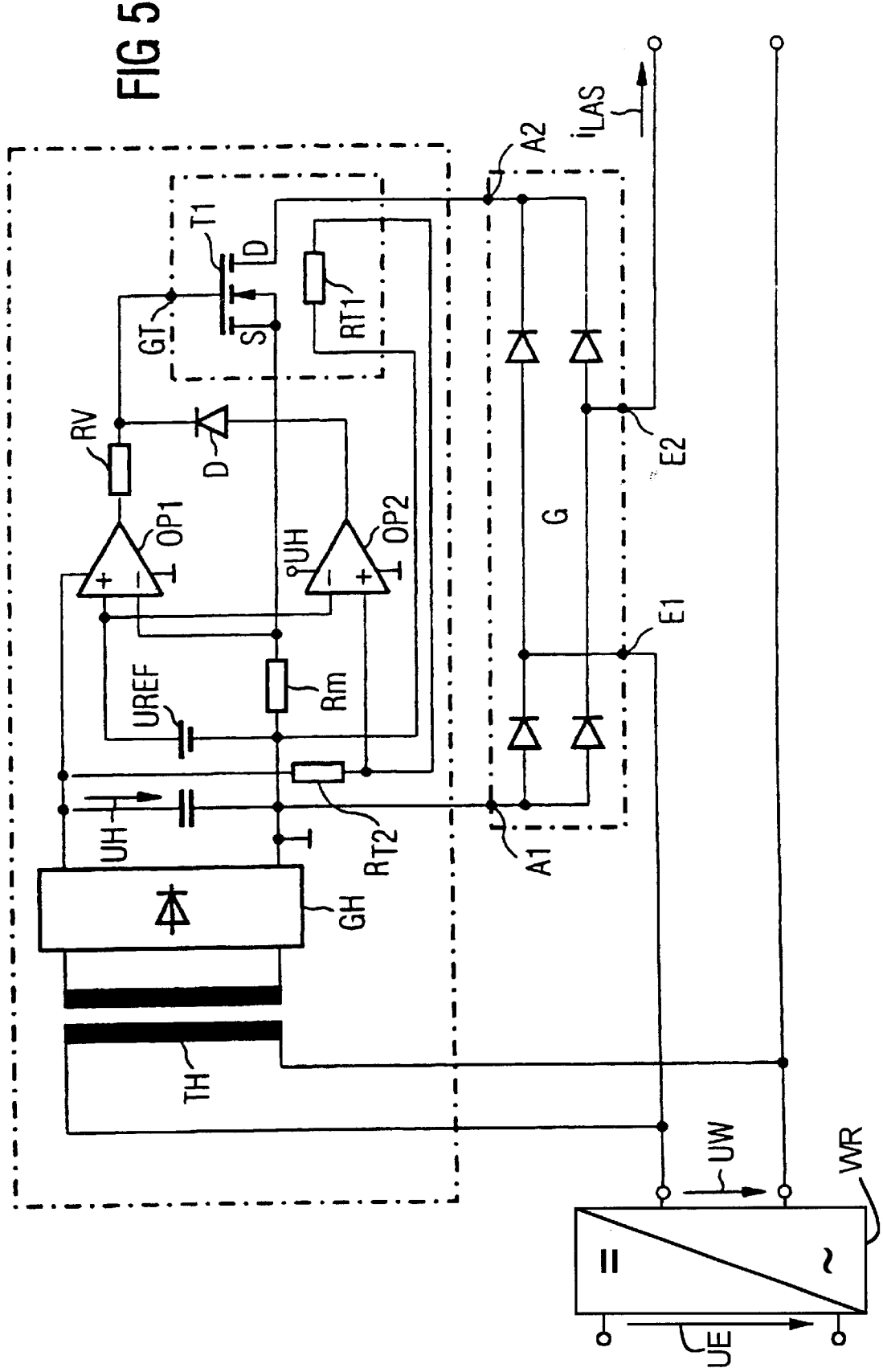

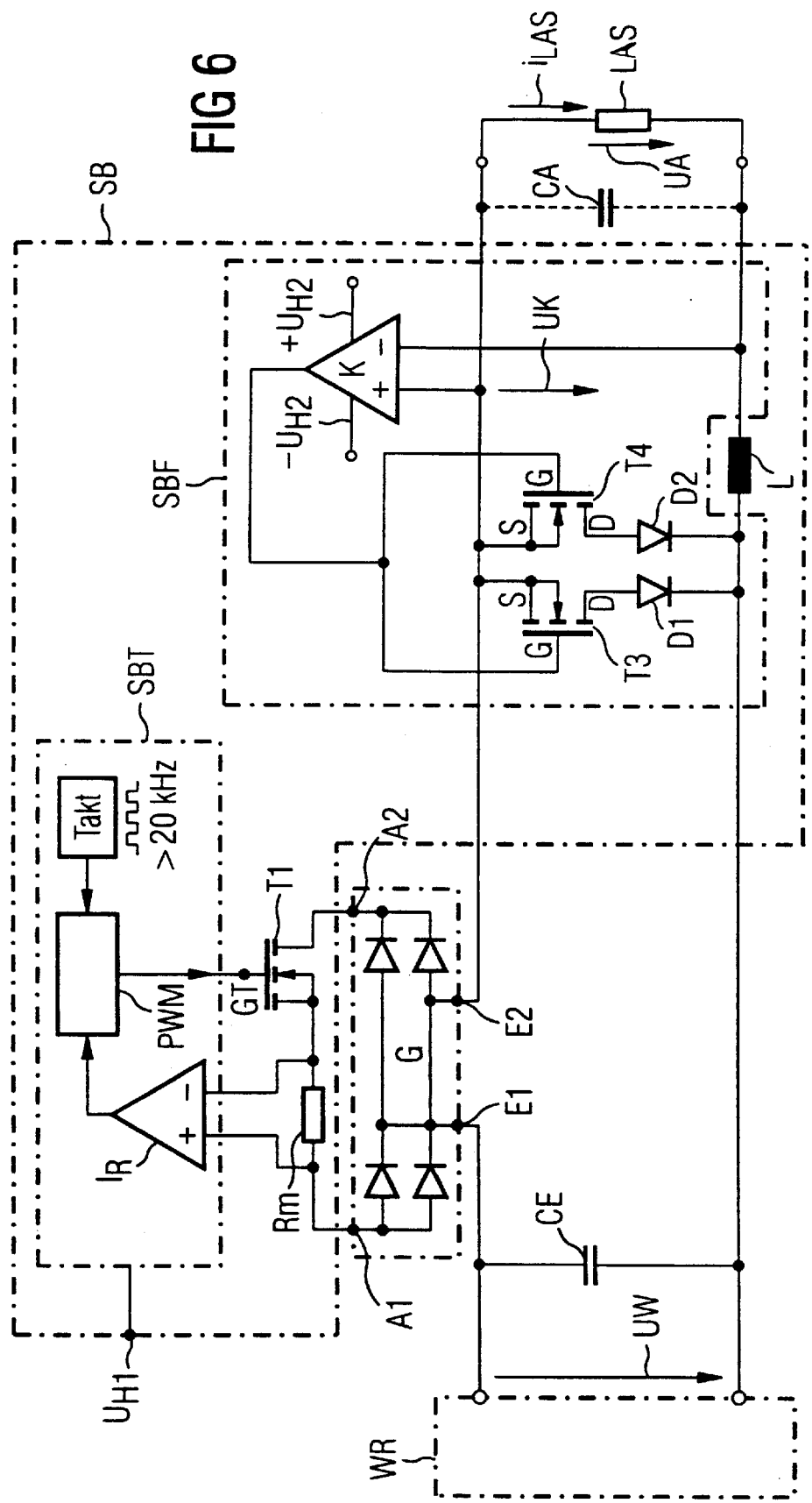

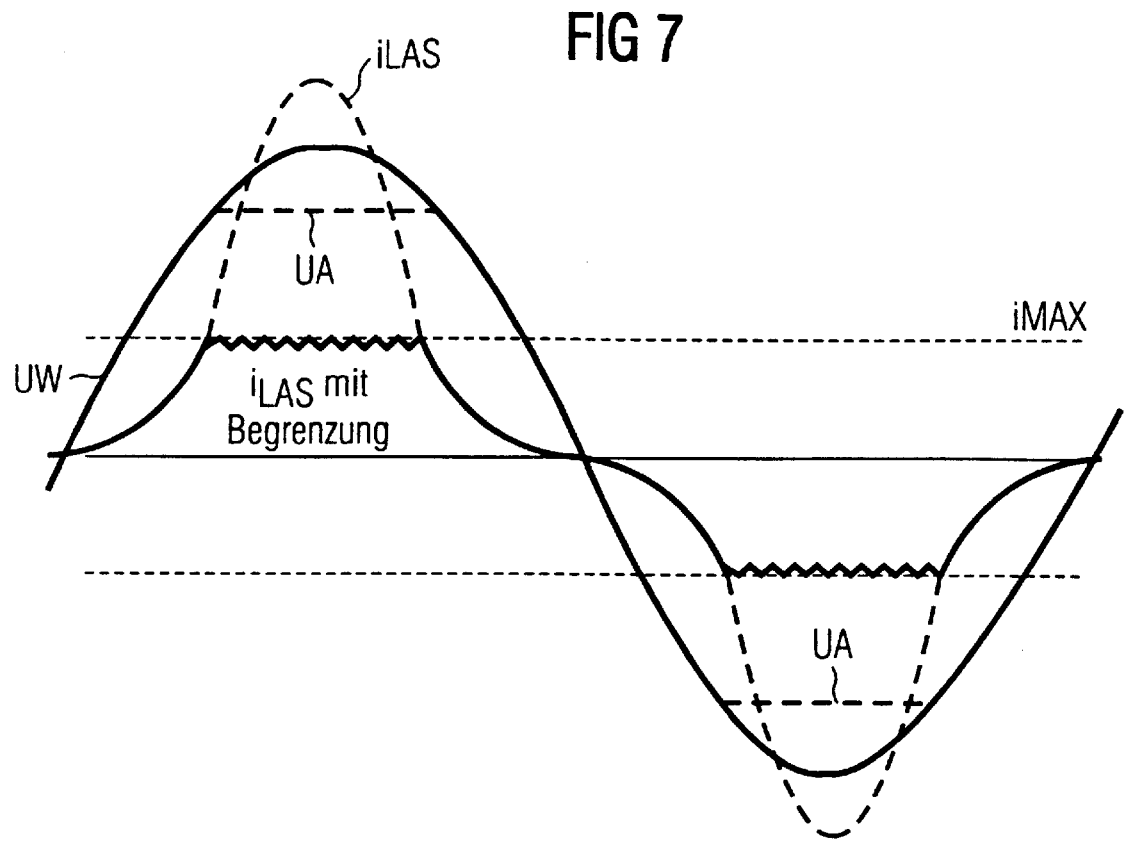

CIRCUIT ARRANGEMENT AND METHOD FOR LIMITING CURRENT FOR CONSUMERS OF ALTERNATING CURRENT

BACKGROUND OF THE INVENTION

The present invention relates to a circuit arrangement and method for limiting current for consumers of alternating current.

A number of consumers, for instance assemblies, assembly units, modems, personal computers, printers, and monitors, and so on, are connected to an inverter at the output side. These consumers are mostly dimensioned for operation at a low-impedance network, the result of which is high inrush currents. A consumer's inrush current often amounts to a multiple of its nominal current. This high inrush current results in a voltage dip at the output of the inverter. In turn, a voltage dip gives rise to failures in the other consumers that are connected to the inverter. In order to avoid a high current flow through a consumer that is connected to an inverter, these often have current limiting devices that consist of a choke, which are arranged at the inverter at the output side.

The disclosure document German Patent Application No. 35 02 195 teaches a limiting circuit for alternating current. In this current limiting circuit, a variable resistance is connected to the terminals of a bridge rectifier circuit for the purpose of limiting the current. This variable resistance consists of a parallel circuit composed of a first series circuit, which is formed by two resistors, and a second series circuit, which is formed by the collector-emitter system of a transistor and an additional resistor. The transistor is controlled via the voltage splitter of the first series circuit and an additional transistor.

The U.S. Pat. No. 4,396,882 teaches a circuit arrangement of an inrush current limiter.

SUMMARY OF THE INVENTION

It is an object of the present invention to set forth a circuit arrangement and a method for limiting current for an alternating current consumer.

This object is achieved in accordance with the invention in a circuit arrangement for limiting current, particularly for limiting an inrush current, for at least one consumer connected to an inverter, said circuit arrangement comprising: a rectifier unit and a current limiting unit. The rectifier unit arranged in series with said consumer, said rectifier unit having: a first input-side terminal, a second input-side terminal, a first output-side terminal, and a second output-side terminal, said rectifier unit for rectifying an alternating current delivered by said inverter to said consumer and flowing through said first and second input-side terminals. The current limiting unit having: a first input connected to said first output-side terminal of said rectifying unit; a second input connected to said second output-side terminal of said rectifying circuit; a reference voltage source having an input connected to said first input of said current limiting unit and an output; a series circuit connected across said first and second inputs of said current limiting unit, said series circuit including a measuring shunt connected in series with a controlled system of a first switching element, said measuring shunt having a first input connected to said first input of said current limiting unit and a second input connected to an input of said controlled system of said first switching element, said controlled system of said first switching element having an output connected to said second input of said current limiting unit, said first switching element having a control input; and a current regulator having a first input connected to said input of said controlled system of said first switching element, a second input connected to said output of said reference voltage source, and an output connected to said control input of said first switching element.

This object is also achieved in accordance with the invention in a method for limiting a current, particularly for limiting an inrush current, for at least one consumer that is connected to an alternating current voltage source, said method comprising the steps of: rectifying an alternating current delivered by said alternating current voltage source to said consumer; applying said rectified alternating current to an input of a current limiting unit; and limiting said alternating current flowing through said consumer to a predetermined value with said current limiting unit when a permissible current value is exceeded.

These and other features of the invention(s) will become clearer with reference to the following detailed description of the presently preferred embodiments and accompanied drawings.

DESCRIPTION OF THE DRAWINGS

FIG. 5 is a schematic circuit diagram of a further embodiment of a circuit layout according to FIG. 4.

FIG. 6 is a schematic circuit diagram of a clocked inrush voltage imitating device.

FIG. 7 shows the shape of a current/voltage characteristic of a clocked current limiting circuit.

DETAILED DESCRIPTION OF THE PRESENTLY PREFERRED EMBODIMENTS

Figure 1:
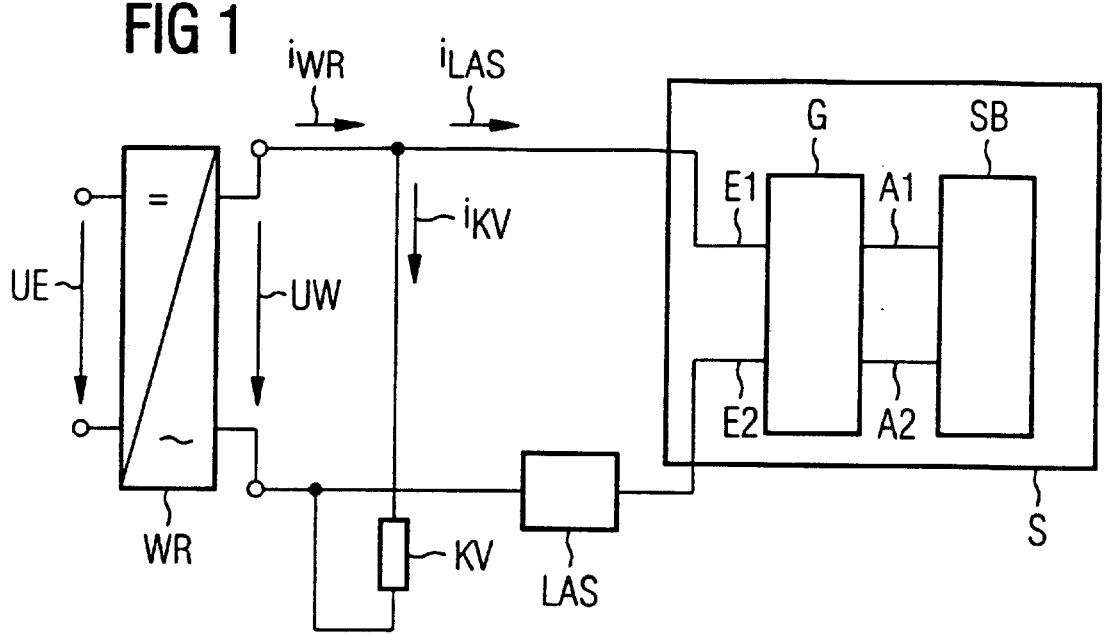
FIG. 1 is a schematic circuit diagram of an alternating current limiting circuit.

FIG. 1 is a basic circuit diagram of a current limiting circuit S. The circuit arrangement for limiting the current, particularly for limiting the inrush current, comprises a rectifier unit G and a current limiting unit SB. With a first input E1 and a second input E2, the rectifier unit G is inserted into an a.c. circuit formed by, for instance, a consumer LAS and an a.c. voltage UW that is generated by an inverter WR. At the input side the inverter WR is connected to a d.c. voltage source UE. The current limiting unit SB is connected to a first and second output A1,A2 of the rectifier unit G. The current limiting unit SB respectively limits the instantaneous current when this rises above a maximum value. For the sake of providing an overview, only one additional consumer KV is connected to the output of the inverter WR. The current iWR through the inverter WR is split into the current iLAS through the consumer LAS and the current iKV through the additional consumer.

Figure 2:
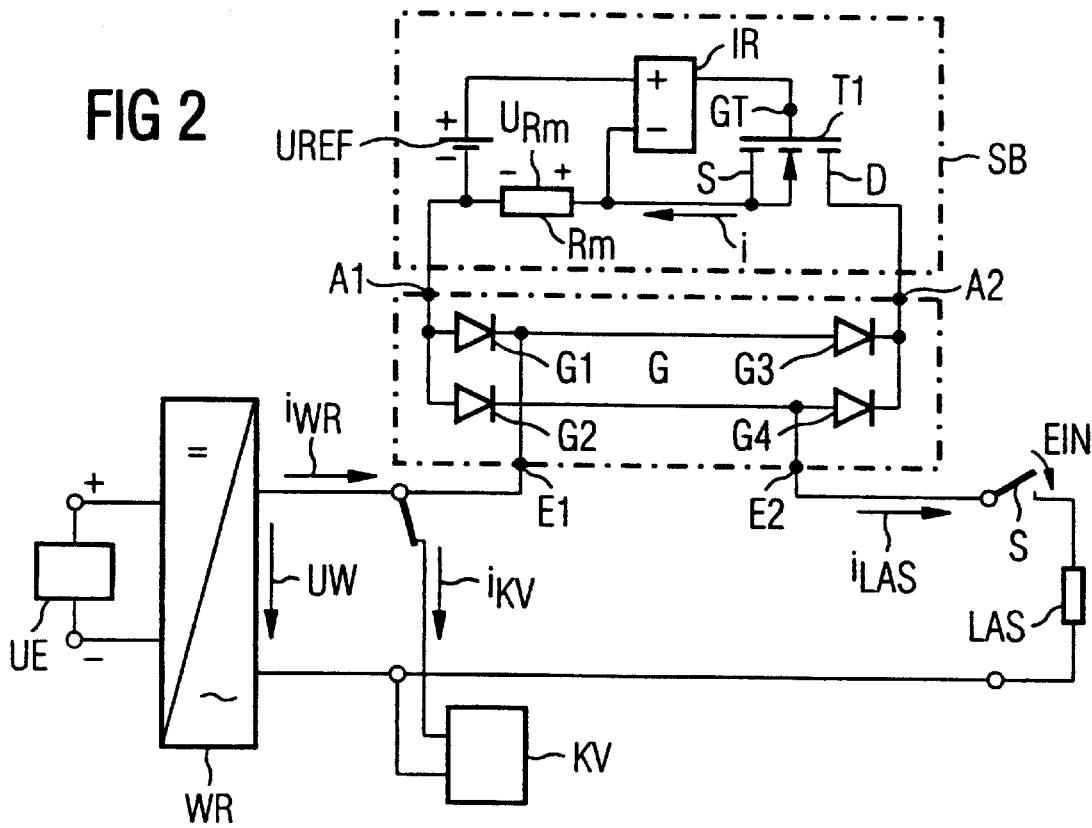
FIG. 2 is a schematic circuit diagram of a current limiting circuit.

In FIG. 2, a rectifier unit G is connected in series with a consumer LAS to an inverter WR. A current limiting unit SB is connected to the outputs A1,A2 of the rectifier unit G. At the input side, the inverter WR is powered by the d.c. source UE. At the output of the inverter WR, a variably high alternating voltage UW can be tapped, depending on the dimensioning of the inverter WR. Only one additional consumer KV is still connected at the output of the inverter WR. In this representation, the current limiting unit SB, in particular a circuit arrangement for limiting inrush current, is formed by a measuring shunt Rm, a current regulator IR, and a first switching element T1. The rectifier unit G comprises a rectifying circuit consisting of four diodes G1,G2,G3,G4. The outputs A1,A2 of the rectifier unit G are connected to a series circuit formed by the measuring shunt Rm and the first switching element T1. The control input GT of the first switching element T1 is connected to the output of a current regulator IR. A first input of the current regulator IR is connected to a reference voltage UREF, and a second input of the current regulator IR is connected to the measuring shunt Rm at which a voltage potential URm stands pending. The current i through the measuring shunt Rm is measured, and the current regulator IR controls the controlled system S-D of the first switching element T1 via its control input GT in correspondence with the measured current i. The first switching element T1 is preferably realized as a linear actuator. The current limiting unit SB is connected to the consumer LAS via a switch SW, which is controlled by a cut-off mechanism, for example. All currents iLAS, iWR, iKV that are included in FIG. 2 are instantaneous currents. The abbreviations stand for the following: iLAS current through the consumer LAS; iWR: current through the inverter WR; and iKV: current through an additional consumer KV that is to be protected.

Figure 3:
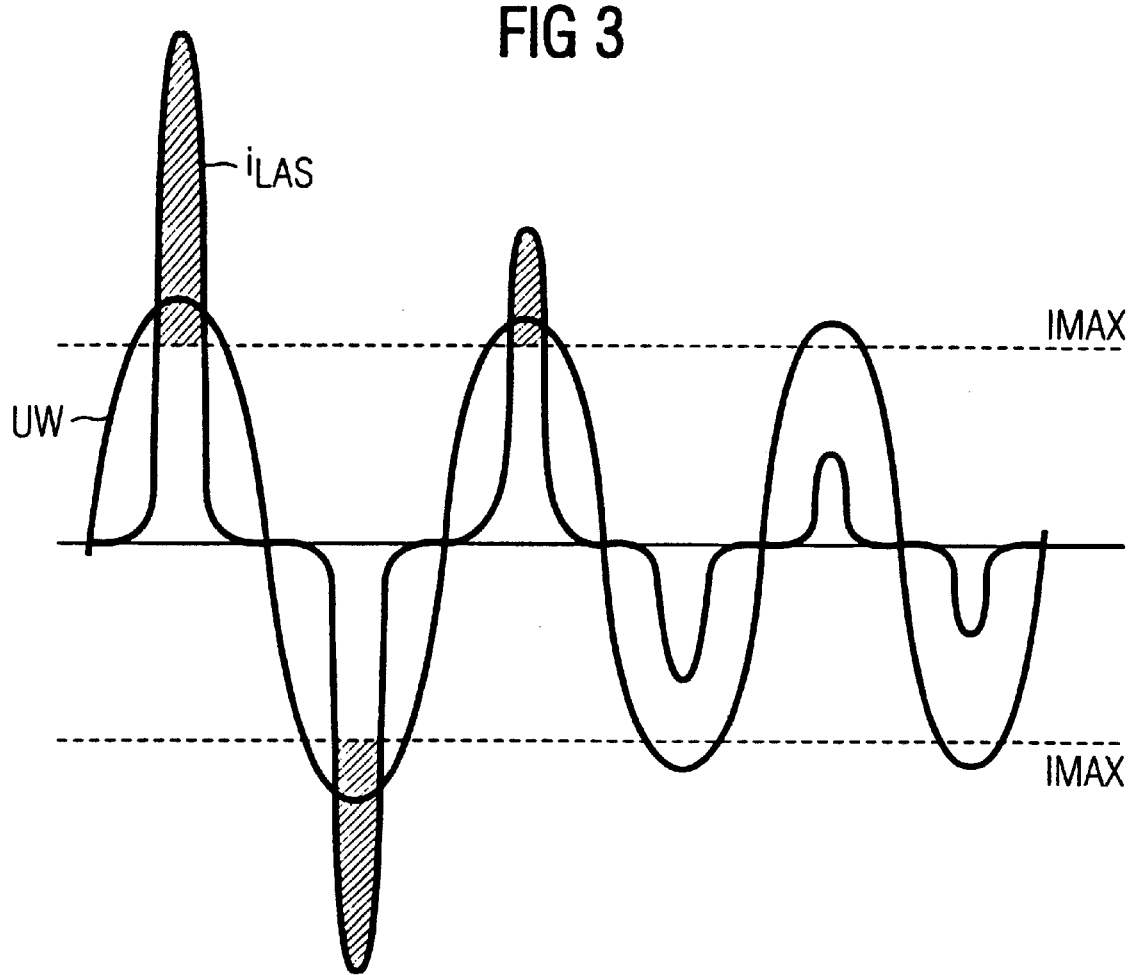
FIG. 3 shows a current and voltage characteristic of a current limiting circuit.

FIG. 3 depicts a characteristic of a current iLAS through a consumer LAS. In the first three half-periods, the peak value of the current iLAS exceeds a maximum permissible output current iMAX that is defined for the inverter WR. The current iLAS is limited without delay when the maximum permissible value iMAX is exceeded. If a current that exceeds the maximum permissible load current iMAX is measured at the measuring shunt Rm, a current regulator IR (as illustrated in FIG. 3, for example), correspondingly actuates a first switching element T1 via its control input GT, so that the current flow through the switching element T1 is reduced. A power MOS transistor is preferably used as the first switching element T1. The first switching element T1 is switched a priori to conduct; i.e., is low-impedance as long as a voltage drop URm at the measuring shunt Rm is smaller than a reference voltage UREF. If the current value of the current iLAS temporarily exceeds the maximum permissible current value iMAX, the first switching element T1 is immediately actuated by the current regulator IR. The limitation to the permissible current iMAX continues to be maintained until the load current iLAS has dropped below the current limit iMAX. Subsequent thereto, the first switching element T1 is again controlled to maximum conduct. Since, in certain cases, the first switching element T1 must accept a significant amount of lost energy during the current limiting process, this should be taken into consideration in the dimensioning of the first switching element T1.

Figure 4:
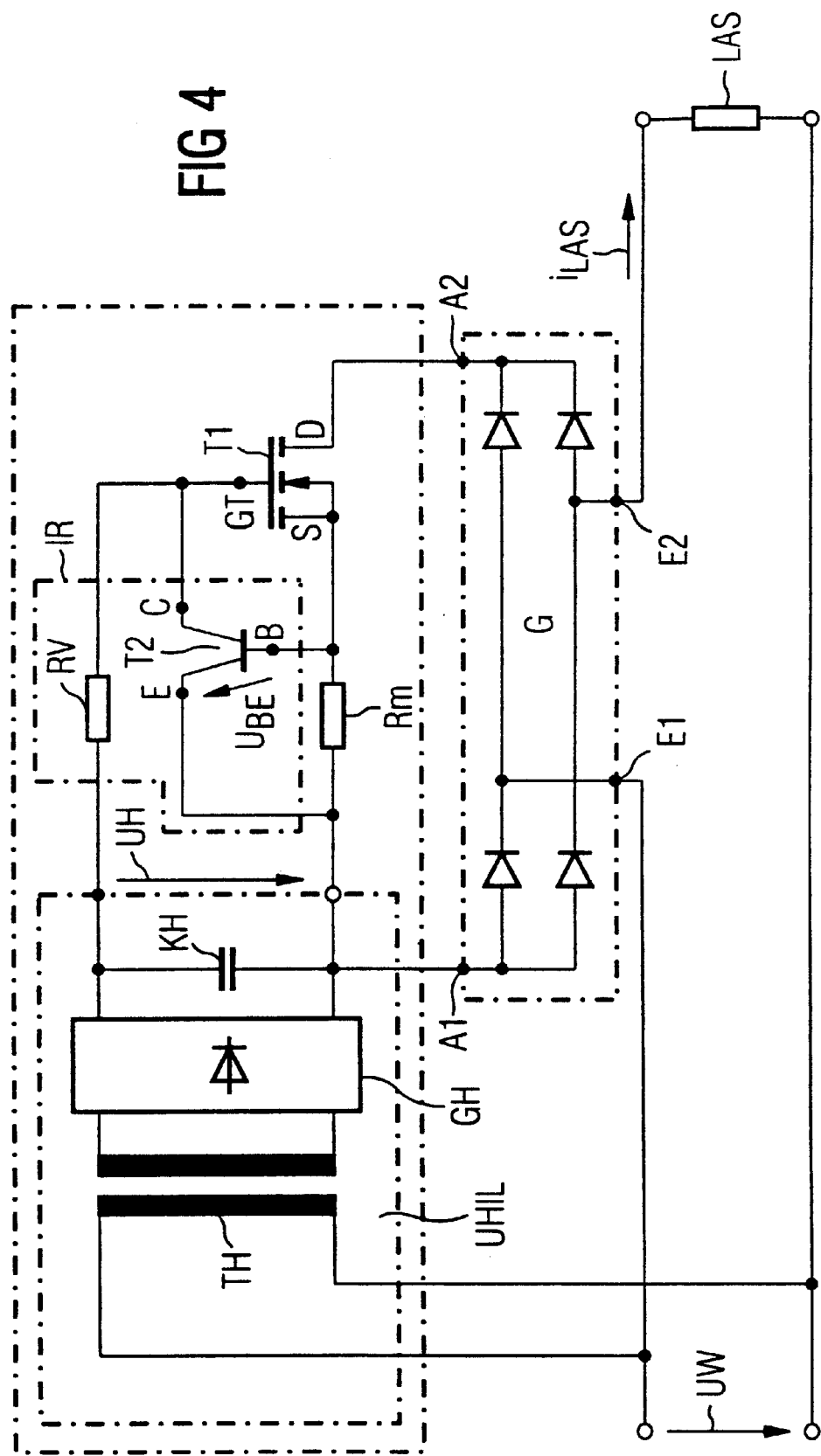
FIG. 4 is a schematic circuit diagram of a further switching layout.

FIG. 4 depicts a circuit layout to the circuit arrangement known from FIG. 2. The essential elements of the circuit arrangement SB are: an auxiliary transformer TH, an auxiliary rectifier GH, a smoothing capacitor KH, a first switching element T1, and a second switching element T2. The auxiliary transformer TH, the auxiliary rectifier GH, and the smoothing capacitor KH are arranged in the auxiliary voltage unit UHIL. The primary side of the auxiliary transformer TH is connected parallel to the output of the inverter WR (which is not shown here) at which an alternating voltage UW stands pending; the auxiliary rectifier GH is connected to the secondary side of the auxiliary transformer TH. The smoothing capacitor KH is arranged parallel to the auxiliary rectifier GH. A first output of the auxiliary rectifier GH is connected to the input S of the controlled system S-D of the first switching element T1 via a measuring shunt Rm. A second output of the auxiliary rectifier GH is connected to the control input GT of the first switching element T1 via a series resistor RV. The output C of the controlled system E-C of the second switching element T2 is connected to the control input GT of the first switching element T1, and the control input B of the second switching element T2 is connected to the input S of the controlled system S-D of the first switching element T1. The input E of the controlled system E-C of the second switching element T2 is connected to the first output of the auxiliary rectifier GH, which is connected to the measuring shunt Rm. The first switching element T1 receives the required switch-through voltage potential via the auxiliary transformer TH, the auxiliary rectifier GH and the series resistor RV, and is switched to low impedance. If an elevated current flow through the consumer LAS emerges during the switch-in process or later in stationary operation, the second switching element T2 is controlled to conduct via the measuring shunt Rm, the first switching element T1 is correspondingly high-impedance, and the load current iLAS is limited to a maximum current value iMAX. When the dynamic process is finished, the first switching element T1 becomes low-impedance again.

FIG. 5 depicts an additional circuit layout of a current limiting unit SB. In this current limiting unit SB, the second switching element T2 from the circuit layout according to FIG. 4 is replaced by a first operational amplifier OP1. With the aid of a second operational amplifier OP2 and the protective circuit with the resistances RT1, RT2 and to a diode D, the current limiting unit SB is kept active when the load current iLAS through the consumer LAS remains high for a longer period of time. But the first switching element T1 is then subjected to a maximum thermal load, which can lead to the destruction of the first switching element T1. To avoid this, the temperature of the first switching element T1 is monitored using a temperature-dependent resistor RT1, which can be a posistor, for example. If a predetermined, still allowable temperature value is exceeded, the temperature-dependent resistor RT1 becomes high-impedance and controls the second operational amplifier OP2. Via the diode D, the first switching element T1 is controlled from the active range into the saturation range. The first switching element T1 is thus controlled to maximum conduct, and the power loss drops to a permissible value. By virtue of a thermal time constant that is defined by the temperature-dependent resistor RT1, instabilities do not occur at the time of the changeover. The thermal protective circuit may also be realized such that, when the temperature is too high, the first switching element T1 is switched off; that is, the current flow to the consumer LAS is interrupted. In this embodiment, it is necessary to interchange the inputs at the second operational amplifier OP2 and to reverse the polarity of the diode D. In this embodiment, the voltage potential at the output of the second operational amplifier OP2 is reduced to such an extent when a critical temperature is exceeded that the first switching element T1 blocks. Which variant is used depends on the priorities with respect to the overall function of the system.

FIG. 6 depicts a clocked current limiting unit SB. This current limiting unit SB is realized by a first module SBT for keeping a load current iLAS constant and into a second module SBF for forwarding load currents subsequent to cut-off. In contrast to the preceding circuit outlays, the module SBT is constructed such that the control input GT of a first switching element T1 is actuated using a pulsewidth modulated signal. The pulsewidth-modulated signal is formed in a pulsewidth modulator PWM. By means of the signals that stand pending at the measuring shunt Rm from the current regulating unit IR based on the voltage potential, the pulsewidth of a (for example) 20 KHz cycle is varied. The current regulator IR can be a UCC 3802 component, for example. The current regulator IR ensures that the current remains constant given overload.

The second module SBF is arranged at the output of the current limiting unit SB. This second module SBF is formed by a transistor separating filter consisting of a third and fourth switching elements T3, T4 and a comparator K. A first separating filter system is formed by the third switching element T3 with a first freewheeling diode D1, and a second separating filter system is formed by the fourth switching element T4 with a second freewheeling diode D2. At the output of the second module SBF, the comparator for controlling the third and fourth switching elements T3/T4 is arranged. Below a permitted current limit, the first switching element T1 is controlled through. A choke L that is arranged in the main circuit has a relatively small inductance, so that it practically represents a short for a load current iLAS with 50 Hz. When a permissible current limit iMAX is exceeded, the current regulator IR in the first module SBT shortens the make-time of the first switching element T1 by actuating the pulsewidth modulator PWM accordingly. When the first switching element T1 is switched off, the first or second freewheeling diode D1 or D2, depending on the direction of the voltage or the current, must forward the current that is impressed in the choke L.

The comparator K evaluates the polarity of the output voltage UA and actuates either the third or the fourth switching element T3,T4. If the third switching element T3 is an n-channel transistor, for example, then when the polarity of the output voltage UA is positive, a current flow through the first freewheeling diode D1 is enabled. Given a resistive load or a load with non-linear current but in phase with the voltage, then the first diode D1 becomes active as a freewheeling diode in the inception of the clocking of the first switching element T1. Analogously, the third switching element T3 releases the diode D2 given negative polarity of the output voltage when this element is a p-channel transistor. If the current through the current limiting unit SB remains under a limit value, the third and fourth switching elements T3, T4 are in fact actuated in a push-pull process and are conductive for a half-period each and the pertaining diodes D1,D2 are loaded only in the block direction. Besides the auxiliary voltage potential UH1 for the first module SBT, an additional auxiliary voltage potential+/−UH2, which is galvanically separated from the alternating voltage UW of the inverter WR, is additionally required for the second module SBF. The third and fourth switching elements T3, T4 can be transistors, IGBT or bipolar transistors, for example. The third and fourth switching elements T3, T4 must switch slowly, in the cycle of the network frequency (50/60 Hz) only. Besides the blocking capability, what is advantageous about the first and second freewheeling diodes D1, D2 is a short blocking delay, which corresponds to the clock frequency and switching speed of the first switching element T1.

If necessary, a high-frequency component can be sharply reduced by a relatively small capacitor CA such as is illustrated in FIG. 6 at the output of the current limiting unit SB. Given a predominantly capacitive load, the current limiting unit SB need not be switched off with the capacitor CA. To compensate the line lengths between the output of the inverter WR and the input of the current limiting unit SB, a capacitor CE should be arranged at the output of the inverter WR. Besides acting as a current limiting unit for non-periodic processes such as start-up, Degauss, and so on, the circuit arrangement according to FIG. 6 is suitable for a low-loss current limitation given periodically occurring current peaks. With a wiring arrangement as illustrated in FIG. 6, the dimensioning of an inverter WR can be reduced considerably.

FIG. 7 shows a basic characteristic of a current/voltage characteristic in a clocked current limiting unit SB. As in a conventional chopper regulator, a chopped network voltage arises at the first switching element T1, at the freewheeling diodes D1, D2, and at the choke L. The current iLAS through the consumer LAS has a triangular superposition corresponding to the dimensioning. The current characteristic illustrated in FIG. 7 over one period is typical of a permanent current of many network devices. Crest factors of from 3 to 4 are very common here. A crest factor is the ratio of the actual peak value to an ideal sinusoidal peak value given the same r.m.s. value.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A circuit arrangement for limiting peak current, comprising:

an inverter providing an AC voltage output, a series circuit comprising a consumer and input terminal of a rectifier unit connected across said output;

a current limiter having first and second terminals connected across output terminals of the rectifier unit;

a series circuit comprising a measuring shunt and a switching element being connected across the first and second terminals, a control input of the switching element connected to an output of a current regulator, a first input terminal of the current regulator connecting to one side of the measuring shunt and a second input terminal of the current regulator connecting to an opposite side of the measuring shunt; and the current regulator controlling the switching element so that when a peak current flows through the switching element, a height of the peak current is limited to a desired maximum current value determined primarily only by a potential across said measuring shunt.

2. The circuit arrangement of claim 1 wherein the current regulator first input terminal connects to said one side of the measuring shunt through a reference voltage source.

3. The circuit arrangement according to claim 2 wherein the current limiter comprises a source-drain path in series with said measuring shunt and a transistor whose base is connected between the source-drain path and the measuring shunt, whose collector is connected to a gate of the switching element, whose emitter is connected to a side of the measuring shunt opposite the source-drain path, and a resistor connected between the gate of the switching element and one of the first and second output terminals of a rectifier circuit.

4. The circuit arrangement according to claim 2 wherein the current limiter comprises a temperature dependent resistor measuring a temperature of the switching element and connecting to an operational amplifier, an output of the operational amplifier connects to the control input of the switching element to control the switching element from an active range into a saturation range if a maximum temperature is exceeded.

5. The circuit arrangement according to claim 2 wherein said current regulator comprises an operational amplifier having a first input connected to one side of said measuring shunt, a second input connected to said reference voltage, and its output connected to the control input of said switching element.

6. The circuit arrangement according to claim 1 wherein the current limiter comprises an operational amplifier having its first input connecting to the one side of said shunt and its second input connecting to the opposite side of said shunt, and wherein an output of the operational amplifier connects to an input of a clocked pulse width modulator, an output of the clocked pulse width modulator connecting to the control input of the switching element.

7. The circuit arrangement according to claim 6 wherein the current limiter further comprises a module for forwarding load currents subsequent to cutoff, said module having a first terminal connecting to an output of said inverter and a second terminal connecting to one of the input terminals of said rectifier unit, a third terminal connecting to one side of said consumer, and a fourth terminal connecting to an opposite side of said consumer.

* * * * *